Dec. 19, 1961  M. P. HNILICKA, JR  3,013,877
PRODUCTION OF METALS FROM THEIR HALIDES
Original Filed July 27, 1956
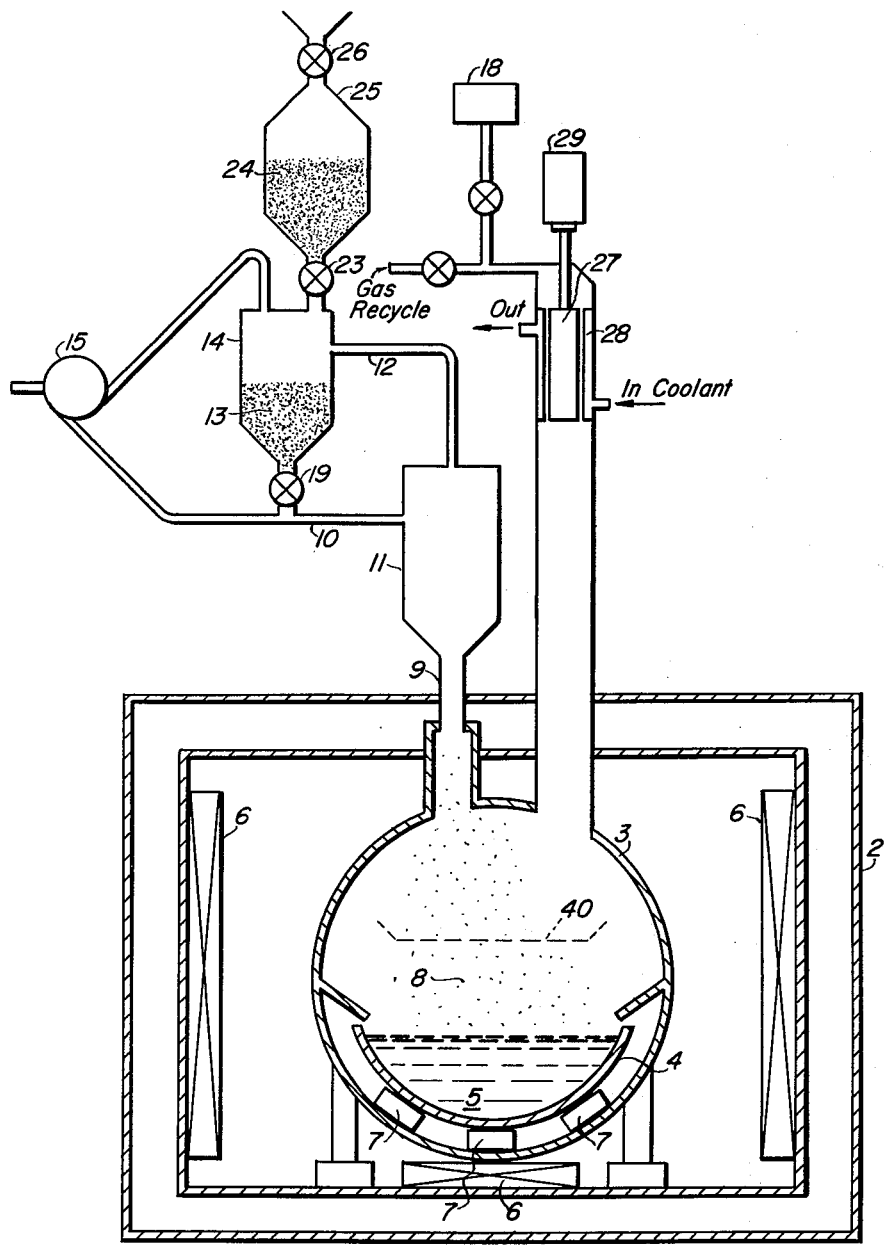
INVENTOR.
BY Milo P. Hnilicka, Jr.
Oliver W. Hayes United States Patent Office 3,013,877
Patented Dec. 19, 1961

3,013,877
PRODUCTION OF METALS FROM THEIR HALIDES
Milo P. Hnilicka, Jr., Concord, Mass., assignor to National Research Corporation, Cambridge, Mass., a corporation of Massachusetts
Continuation of application Ser. No. 600,483, July 27, 1956. This application Sept. 5, 1958, Ser. No. 759,294
2 Claims. (Cl. 75—84.5)

This invention relates to a process and apparatus for introducing a solid halide of a refractory metal such as titanium, zirconium and the like into a reaction chamber, containing a liquid metal reducing agent. This application is a continuation of my copending application Serial Number 600,483, filed July 27, 1956, now abandoned.

The production of metallic zirconium has recently been the object of an enormous amount of research work by leading industrial concerns throughout the United States. Many methods have been proposed for the production of zirconium, a number of these involving the metallothermic reduction of zirconium halides. In particular, the magnesium reduction of zirconium tetrachloride has begun to assume considerable commercial importance. Most of the prior art processes which employ the reduction of zirconium halide by the use of a liquid metal reducing agent, such as magnesium, comprise the use of a bath of the liquid reducing agent within a reaction chamber. Zirconium tetrachloride, however, is a crystalline solid which sublimes at atmospheric pressure at 331° C. and which cannot be liquefied without application of excessive pressures. Therefore, it was heretofore necessary to either preplace a charge of solid $ZrCl_4$ in the reactor and sublime it in situ, or to employ external sublimation devices from which the vapors could be introduced into the reaction chamber through heated conduits maintained at well above 331° C. Because of the many difficulties experienced, including the frequent plugging of these conduits, the external sublimation processes have not proven commercially feasible.

Preplacing solid zirconium halide inside the reaction chamber where it could be sublimed by the effect of the reaction heat and the radiation from the retort walls, thereby diffusing it into contact with the liquid reducing agent, has also involved rather serious disadvantages. The rate of sublimation of the zirconium halide is enormously difficult to control and, as a result, the rate of reaction easily fluctuates between values wherein the reaction proceeds far too rapidly and values wherein the reaction substantially ceases.

In the present invention, the difficulties inherent in the prior art processes have been successfully resolved or circumvented.

For a fuller understanding of the nature and objects of the invention, reference should be had to the following detailed description taken in connection with the accompanying drawing wherein the figure is a diagrammatic embodiment of one form of the invention.

The present invention is particularly directed to improved apparatus for the introduction of solid halides of titanium, zirconium and the like into a reaction chamber similar to that described in copending patent application Serial No. 565,411, now Patent No. 2,880,987, granted April 7, 1959. For convenience of illustration, the invention will be primarily described in connection with the production of zirconium by a process wherein solid zirconium tetrachloride is introduced into a reaction chamber in which it is reduced to zirconium metal by means of a reducing agent such as magnesium. This specific embodiment is utilized for the purposes of illustration only, and it is not to be construed that the scope of the invention is thereby limited.

In the instant invention, zirconium tetrachloride in particulate form, the particles being preferably 20 to 100 mesh, is introduced, at a controlled rate, into a reaction chamber preheated to a temperature between about 800° and 900° C. This is accomplished by slowly releasing the powdered zirconium tetrachloride into a pipe, through which a stream of inert gas, preferably having a velocity of 30 to 60 feet./sec., is being directed. This particle-laden gas stream is then introduced into the reaction chamber containing a liquid reducing agent such as magnesium, wherein the zirconium tetrachloride is reduced to zirconium metal. The inert gas is subsequently preferably recirculated.

In a preferred embodiment of the invention the powdered zirconium tetrachloride, stored in a hopper, is released at a metered rate into the inert gas stream and is carried by the gas stream to a disengaging cyclone wherein the solid particles leave the gas stream and fall into the reaction chamber. In this chamber, due to the high temperature of the chamber and the very large relative surface and small mass of the fine particles of the zirconium tetrachloride, a rapid and substantially complete vaporization (sublimation) takes place while the particles fall toward the surface of the molten metal reducing agent. Any small particles which reach the molten reducing surface are vaporized immediately after landing thereon.

Referring now to the drawing, there is illustrated one preferred embodiment of the invention wherein a reaction chamber of the type claimed in the copending application of Hnilicka and Vaughan, Serial No. 565,411, can be utilized in the metallothermic reduction of a solid halide of a refractory metal such as titanium or zirconium. The reaction chamber 3 which is contained within an air-tight enclosure 2 can be evacuated by means of a vacuum pump, schematically indicated at 18. Within the reaction chamber is a crucible 4 which contains liquid magnesium 5. Rollers 7 are provided under the crucible to allow the crucible to be readily removed from the reaction chamber; heaters 6 are provided within the enclosure 2 in order to heat the reaction chamber. From the upper portion of the reaction chamber, a pipe means 9 extends to a disengaging means 11, such as a cyclone separator. A second pipe means 10 extends from the disengaging means to a hopper 14 wherein solid zirconium halide 13 in particulate form is stored. The stored halide can be slowly fed into the pipe means 10 by means of a metering means 19, such as a star valve. In order to keep the conduit leading to the vacuum pump from becoming plugged up by the condensation of $ZrCl_4$ vapor, a condenser of the type described in U.S. 2,406,682 is inserted into the conduit. This condenser has a heated rotating blade 27 which scrapes off the condensed $ZrCl_4$ from the cooled walls of the condenser, thereby allowing the solid particles of $ZrCl_4$ to fall back into the reaction chamber where they will resublime into $ZrCl_4$ vapor.

In a typical run, the solid zirconium tetrachloride 13, stored in hopper 14, is fed slowly into the pipe means 10 by means of the metering device 19. An inert gas stream is passed through the pipe 10, thereby entraining the solid zirconium tetrachloride and carrying it into the disengaging means 11. While in the disengaging means, the gas and solid halide are separated; the solid halide falls by means of the conduit means 9 into the reaction chamber 3 and the inert gas is recirculated by means of pipe means 12 and a pump, schematically indicated at 15, through the hopper 14, thereby causing the minute particles of zirconium tetrachloride still entrained in the gas stream to be substantially completely divorced therefrom.

As the particles of zirconium tetrachloride 13 enter the reaction chamber 3, the high temperature therein causes the particles to substantially completely sublime as they fall toward the surface of the liquid magnesium 5. Any small particles which reach the surface of the magnesium are sublimed immediately after landing thereon. The zirconium tetrachloride vapors produced subsequently react with the molten reducing agent, thereby producing zirconium metal.

In a preferred embodiment of the invention, a double hopper 25, with air tight closures at 23 and 26, is so arranged as to be capable of being intermittently charged with finely ground zirconium tetrahalide 24 from external sources. This is done by opening closure 26, while closure 23 is kept closed. Subsequently the hopper 25 is either evacuated or flushed with an inert gas, so as to allow transfer of the zirconium tetrachloride, by opening closure 23, into the hopper 14 without exposing the reactor atmosphere to contamination by oxygen or nitrogen.

As was pointed out above, the instant apparatus is entirely suitable for use in the metallothermic reduction of solid halides of other refractory metals such as titanium and tungsten as well as zirconium.

In another embodiment of the invention, a catch-pan 40, shown in dotted lines in the drawing, placed between the point of entry of the zirconium tetrachloride into the reaction chamber and the molten magnesium bath, serves to catch any solid material which falls upon it. Any unsublimated zirconium tetrachloride caught in this way will eventually sublimate; however, any non volatile foreign matter contained in the zirconium halide, such as oxide ash, ferrous chloride, etc., will be caught and retained in the pan, and will not reach the reaction crucible and its contents. In this way, any solid impurities in the mixture of zirconium tetrachloride entering the chamber can be collected on the catch-pan, thereby tending to insure the purity of the molten magnesium bath and the reduced metal.

Since certain changes may be made in the above apparatus without departing from the scope of the invention herein involved, it is intended that all matter contained in the above description, or shown in the accompanying drawings, shall be interpreted as illustrative and not in a limiting sense.

What is claimed is:
1. In the method of preparing a refractory metal by reacting a halide of the refractory metal with molten reducing metal in a closed reaction zone in a reactor, the improvement which comprises establishing a stream of inert gas having suspended therein the halide of said metal in particulate solid state, introducing said suspension into a disengaging zone which is in communication with said reaction zone and out of contact with said molten reducing metal, allowing the solid halide while in the disengaging zone to thereby fall out of and substantially separate from said inert gas, removing the inert gas from the disengaging zone so as to prevent a substantial portion thereof from entering the reaction zone, passing the thus separated metal halide to the reaction zone, vaporizing the substantially separated solid halide in the reaction zone and contacting the vaporized halide with the molten reducing metal in the reaction zone to thereby reduce the refractory metal.

2. The process of claim 1 wherein the halide is zirconium tetrachloride.

References Cited in the file of this patent
UNITED STATES PATENTS

| | | |
|---|---|---|
| 2,091,087 | Wempe | Aug. 24, 1937 |
| 2,456,918 | Church | Dec. 21, 1948 |
| 2,607,674 | Winter | Aug. 19, 1952 |
| 2,618,549 | Glasser | Nov. 18, 1952 |
| 2,708,158 | Smith | May 10, 1955 |
| 2,881,067 | Hivert | Apr. 7, 1959 |

FOREIGN PATENTS

| | | |
|---|---|---|
| 167,508 | Australia | Apr. 20, 1956 |